(12) United States Patent
Suciu et al.

(10) Patent No.: US 10,502,142 B2
(45) Date of Patent: Dec. 10, 2019

(54) TURBINE ENGINE GEARBOX ASSEMBLY WITH SETS OF INLINE GEARS

(71) Applicant: United Technologies Corporation, Farmington, CT (US)

(72) Inventors: Gabriel L. Suciu, Glastonbury, CT (US); Hung Duong, Unionville, CT (US); Jonathan F. Zimmitti, Glastonbury, CT (US); William G. Sheridan, Southington, CT (US); Michael E. McCune, Colchester, CT (US); Brian Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 266 days.

(21) Appl. No.: 15/484,841

(22) Filed: Apr. 11, 2017

(65) Prior Publication Data

US 2018/0291818 A1    Oct. 11, 2018

(51) Int. Cl.
*F02C 7/32* (2006.01)
*F16H 1/22* (2006.01)

(52) U.S. Cl.
CPC .............. *F02C 7/32* (2013.01); *F16H 1/22* (2013.01); *F05D 2250/31* (2013.01); *F05D 2260/4031* (2013.01)

(58) Field of Classification Search
CPC ....... F02C 7/32; F02C 7/36; F02D 2260/4031
USPC ...................... 60/802; 415/124.11
See application file for complete search history.

(56) References Cited

U.S. PATENT DOCUMENTS

| 2,978,869 | A | * | 4/1961 | Hiscock | F02C 7/32 |
| | | | | | 60/791 |
| 7,552,591 | B2 | | 6/2009 | Bart et al. | |
| 7,975,465 | B2 | * | 7/2011 | Morris | F02C 6/08 |
| | | | | | 244/60 |
| 7,997,085 | B2 | * | 8/2011 | Moniz | F01D 15/10 |
| | | | | | 60/778 |
| 8,347,637 | B2 | * | 1/2013 | Suciu | F02C 7/32 |
| | | | | | 60/802 |
| 8,490,410 | B2 | * | 7/2013 | Suciu | F02C 7/32 |
| | | | | | 60/788 |
| 8,490,411 | B2 | * | 7/2013 | Suciu | F02C 7/32 |
| | | | | | 60/788 |

(Continued)

FOREIGN PATENT DOCUMENTS

GB        839961 A      6/1960

OTHER PUBLICATIONS

EP search report for EP18166670.2 dated Aug. 24, 2018.

*Primary Examiner* — Ruth Ilan
(74) *Attorney, Agent, or Firm* — O'Shea Getz P.C.

(57) ABSTRACT

An assembly is provided for a gas turbine engine with an axial centerline. This assembly includes a gearbox, a first torque transmission apparatus and a second torque transmission apparatus. The gearbox includes a plurality of first gears and a plurality of second gears. The first gears are meshed together and respectively rotatable about parallel first gear axes. The second gears are meshed together and respectively rotatable about parallel second gear axes. Each of the first gear axes and each of the second gear axes is non-parallel with the axial centerline. The first torque transmission apparatus is configured to drive the first gears. The second torque transmission apparatus is configured to drive the second gears.

18 Claims, 6 Drawing Sheets

(56) References Cited

U.S. PATENT DOCUMENTS

| | | | |
|---|---|---|---|
| 8,973,465 B2* | 3/2015 | Duong | F16H 1/222 |
| | | | 60/802 |
| 9,316,158 B2* | 4/2016 | Peltier | F02C 7/32 |
| 9,845,735 B2* | 12/2017 | Duong | F02C 7/32 |
| 10,077,715 B2* | 9/2018 | Viel | F02C 7/06 |
| 10,190,505 B2* | 1/2019 | Viel | F02C 7/32 |
| 2008/0148881 A1* | 6/2008 | Moniz | F02C 7/32 |
| | | | 74/15.6 |
| 2009/0139243 A1 | 6/2009 | Winter | |
| 2009/0188334 A1 | 7/2009 | Merry et al. | |
| 2009/0232640 A1* | 9/2009 | Deperrois | F02C 7/32 |
| | | | 415/122.1 |
| 2009/0302152 A1* | 12/2009 | Knight | B64D 41/00 |
| | | | 244/58 |
| 2010/0242496 A1* | 9/2010 | Cass | F02C 7/32 |
| | | | 60/802 |
| 2011/0239660 A1* | 10/2011 | Suciu | F01D 15/12 |
| | | | 60/784 |
| 2011/0128993 A1 | 12/2011 | Chou | |
| 2013/0193688 A1 | 8/2013 | Duong et al. | |
| 2015/0204246 A1* | 7/2015 | Peltier | F02C 7/32 |
| | | | 74/416 |
| 2016/0040601 A1 | 2/2016 | Frost et al. | |
| 2016/0169118 A1 | 6/2016 | Duong | |
| 2016/0201789 A1* | 7/2016 | Duong | F02C 7/32 |
| | | | 74/606 R |
| 2016/0230843 A1 | 8/2016 | Duong et al. | |
| 2016/0245183 A1* | 8/2016 | Viel | F02C 7/32 |
| 2016/0376990 A1* | 12/2016 | Ancuta | F02C 7/14 |
| | | | 415/124.1 |
| 2017/0306854 A1* | 10/2017 | Guillemont | F02C 7/32 |
| 2018/0202310 A1* | 7/2018 | Suciu | F01D 15/12 |
| 2018/0202367 A1* | 7/2018 | Suciu | F02C 7/32 |
| 2018/0266329 A1* | 9/2018 | MacKin | F02C 7/36 |

* cited by examiner

TURBINE ENGINE GEARBOX ASSEMBLY WITH SETS OF INLINE GEARS

BACKGROUND OF THE INVENTION

1. Technical Field

This disclosure relates generally to a gas turbine engine and, more particularly, to a gearbox assembly for a gas turbine engine.

2. Background Information

A typical gas turbine engine includes a gearbox to transmit torque between a spool of the gas turbine engine and a plurality of turbine engine accessories. While various gearbox types and configurations are known in the art, there is still room for improvement.

SUMMARY OF THE DISCLOSURE

According to an aspect of the present disclosure, an assembly is provided for a gas turbine engine with an axial centerline. This gas turbine engine assembly includes a gearbox, a first transmission apparatus and a second transmission apparatus. The gearbox includes a plurality of first gears and a plurality of second gears. The first gears are meshed together in a first plane parallel with the axial centerline. The second gears are meshed together in a second plane parallel with the axial centerline. The first torque transmission apparatus is configured to drive the first gears. The second torque transmission apparatus is configured to drive the second gears.

According to another aspect of the present disclosure, an assembly is provided for a gas turbine engine with an axial centerline. This gas turbine engine assembly includes a gearbox, a first transmission apparatus and a second transmission apparatus. The gearbox includes a plurality of first gears and a plurality of second gears. The first gears are meshed together and respectively rotatable about parallel first gear axes. The second gears are meshed together and respectively rotatable about parallel second gear axes. Each of the first gear axes and each of the second gear axes is non-parallel with the axial centerline. The first torque transmission apparatus is configured to drive the first gears. The second torque transmission apparatus is configured to drive the second gears.

According to another aspect of the present disclosure, another assembly is provided for a gas turbine engine with an axial centerline. This gas turbine engine assembly includes a first rotating assembly, a second rotating assembly and a gearbox. The first rotating assembly is rotatable about the axial centerline and includes a first rotor including a plurality of first rotor blades. The second rotating assembly is rotatable about the axial centerline and includes a second rotor including a plurality of second rotor blades. The gearbox includes a plurality of intermeshed first gears and a plurality of intermeshed second gears. Each of the first gears is rotatable about a respective first axis that is non-parallel with the axial centerline. Each of the second gears is rotatable about a respective second axis is non-parallel with the axial centerline. The first gears are driven by the first rotating assembly. The second gears are driven by the second rotating assembly.

According to still another aspect of the present disclosure, another assembly is provided for a gas turbine engine with a first tower shaft and a second tower shaft. This gas turbine engine assembly includes a gearbox housing, a plurality of first gears, a plurality of second gears, a first torque transmission device and a second transmission device. The first gears are arranged within the gearbox housing and meshed together in a first plane. The second gears are arranged within the gearbox housing and meshed together in a second plane. The second plane is parallel with and spaced from the first plane. The first torque transmission device is configured to couple and transmit torque between the first tower shaft and one of the first gears. The second torque transmission device is configured to couple and transmit torque between the second tower shaft and one of the second gears.

The first gears may be meshed together in a first plane parallel with the axial centerline. The second gears may be meshed together in a second plane parallel with the axial centerline.

The second plane may be parallel with and/or spaced from the first plane.

The second plane may be angularly offset from the first plane by an acute angle.

The second gears may be configured rotatably independent from the first gears.

The first gears may be configured rotatably independent from the second gears.

One of the first gears may have a rotational axis that is non-parallel with the axial centerline. In addition or alternatively, one of the second gears may have a rotational axis that is non-parallel with the axial centerline.

One of the first gears may have a rotational axis that is substantially perpendicular to the first plane. In addition or alternatively, one of the second gears may have a rotational axis that is substantially perpendicular to the second plane.

The first torque transmission apparatus may be configured as or otherwise include a first tower shaft. In addition or alternatively, the second torque transmission apparatus may be configured as or otherwise include a second tower shaft.

The first torque transmission apparatus may be configured as or otherwise include a first bevel gear rotatably attached to one of the first gears. In addition or alternatively, the second torque transmission apparatus may be configured as or otherwise include a second bevel gear rotatably attached to one of the second gears.

The first bevel gear and the second bevel gear may be arranged within the gearbox.

The assembly may include a first rotating assembly and a second rotating assembly that is rotationally discrete from the first rotating assembly. The first torque transmission apparatus may be configured to couple the first rotating assembly with the first gears. The second torque transmission apparatus may be configured to couple the second rotating assembly with the second gears.

The first rotating assembly may include a first compressor rotor, a first turbine rotor and a first shaft that connects the first compressor rotor with the first turbine rotor. The second rotating assembly may include a second compressor rotor, a second turbine rotor and a second shaft that connects the second compressor rotor with the second turbine rotor.

The assembly may include a first turbine engine accessory mounted to the gearbox and a second turbine engine accessory mounted to the gearbox. One of the first gears may be configured to respectively drive actuation of the first turbine engine accessory. One of the second gears may be configured to respectively drive actuation of the second turbine engine accessory.

The first accessory may be configured as or otherwise include a generator.

The first accessory may be configured as or otherwise include a pump.

The first accessory may be configured as or otherwise include a transmission.

The first plane may be parallel with an axial centerline of the gas turbine engine.

The first gears may be configured to rotate independent of the second gears.

The assembly may include a first torque transmission apparatus configured to transfer torque between the first rotating assembly and the first gears. The assembly may also or alternatively include a second torque transmission apparatus configured to transfer torque between the second rotating assembly and the second gears.

The first gears may be meshed together in a first plane that is parallel with the axial centerline. In addition or alternatively, the second gears may be meshed together in a second plane that is parallel with the axial centerline.

Each of the first gear axes and/or each of the second gear axes may be substantially perpendicular to the axial centerline.

The foregoing features and the operation of the invention will become more apparent in light of the following description and the accompanying drawings.

DETAILED DESCRIPTION OF THE INVENTION

Figure 1:
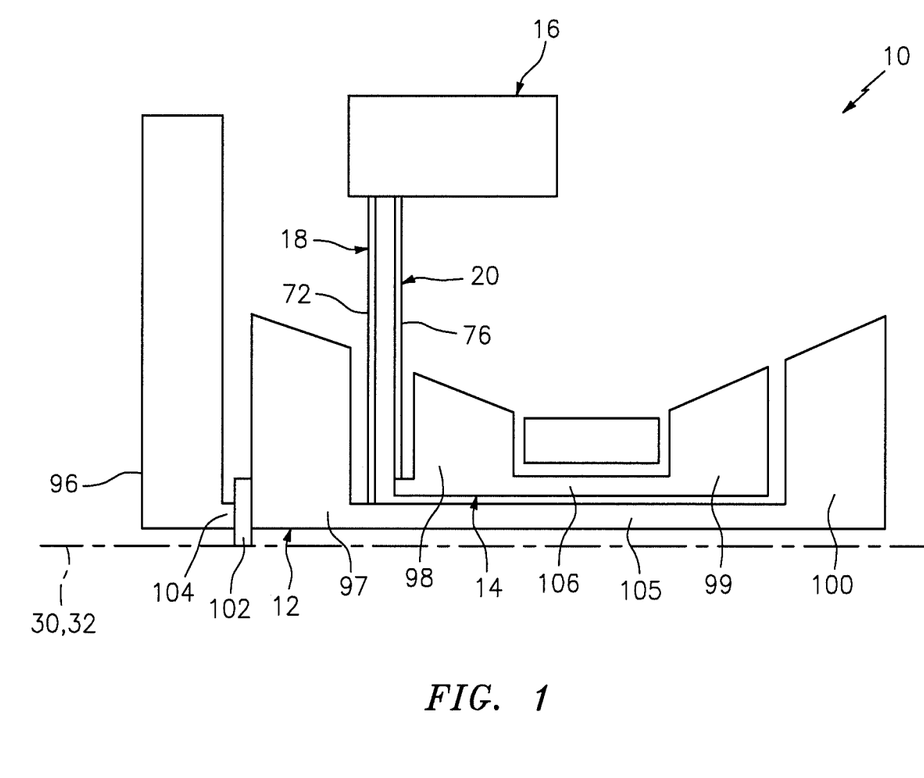
FIG. 1 is a schematic illustration of a portion of an assembly of a gas turbine engine.

FIG. 1 is a schematic illustration of a portion of an assembly 10 of a gas turbine engine. This gas turbine engine may be configured as a hi-bypass turbofan gas turbine engine for an aircraft propulsion system as generally illustrated in FIG. 1 (see also FIG. 6, which is discussed below in further detail). Alternatively, the gas turbine engine may be configured as a turbojet gas turbine engine for an aircraft propulsion system, a gas turbine engine for a land-based power system, or any other type of gas turbine engine which can be configured with an accessory gearbox.

The gas turbine engine assembly 10 of FIG. 1 includes a first rotating assembly 12 and a second rotating assembly 14. The gas turbine engine assembly 10 also includes a gearbox 16, a first torque transmission apparatus 18, a second torque transmission apparatus 20 and a plurality of turbine engine accessories 22-28 (see FIG. 2). Examples of turbine engine accessories include, but are not limited to, a fuel pump, a hydraulic pump, a lubrication pump, a transmission (e.g., reduction gear assembly) and an electrical generator.

The first rotating assembly 12 may be configured as or may be included in a first spool (e.g., a low speed spool) of the gas turbine engine. The second rotating assembly 14 may be configured as or may be included in a second spool (e.g., a high speed spool) of the gas turbine engine. The second rotating assembly 14 is discrete from the first rotating assembly 12. The second rotating assembly 14 of FIG. 1, for example, is not attached to and, thus, can rotate independently from the first rotating assembly 12. The first and the second rotating assemblies 12 and 14, however, may both be rotatable—in the same direction or in different directions—about a common rotational axis 30; e.g., an axial centerline 32 of the gas turbine engine.

Figure 2:
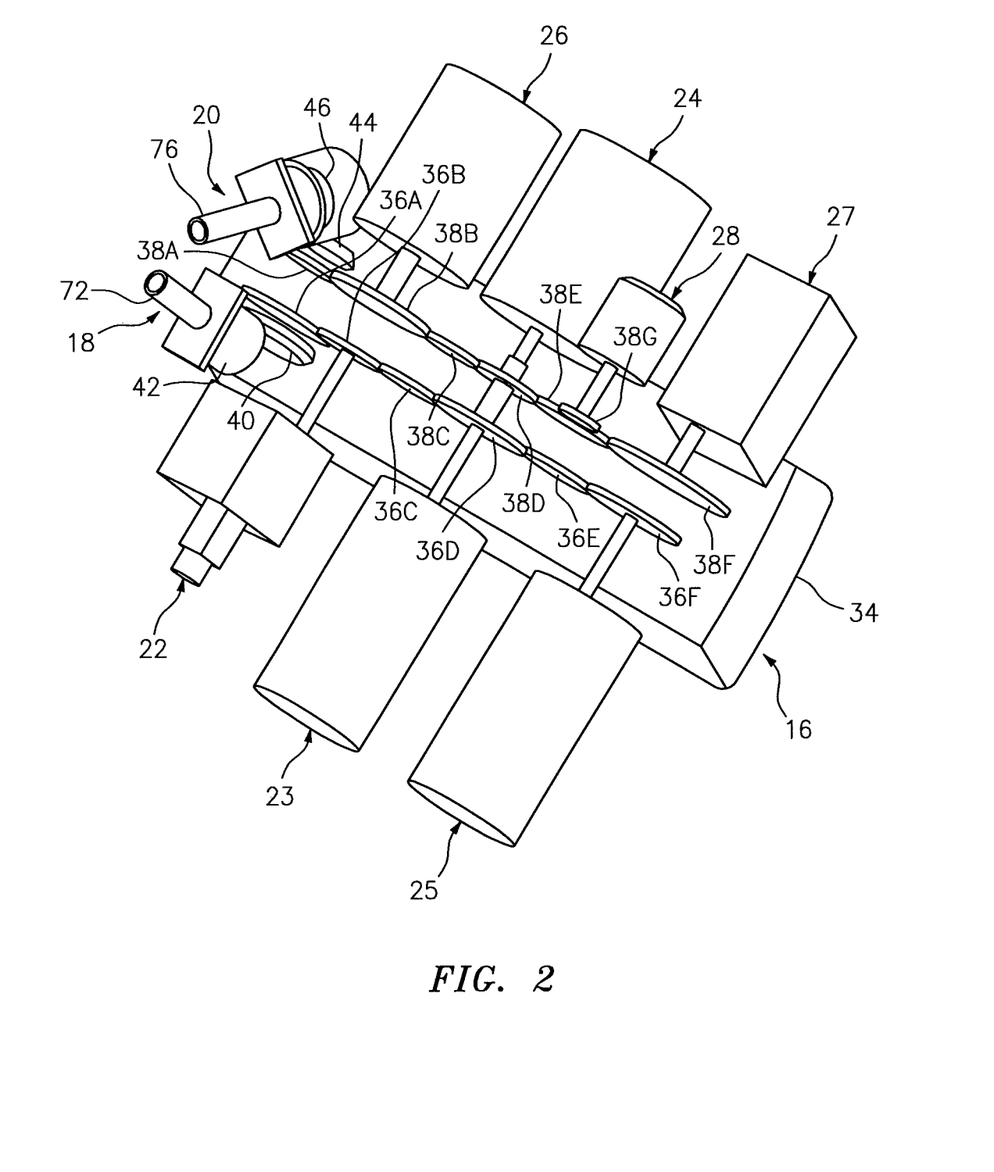
FIG. 2 is a perspective illustration of a gearbox configured with a plurality of torque transmission apparatuses and a plurality of turbine engine accessories, where a housing of the gearbox is shown as being semi-transparent.

Referring to FIG. 2, the gearbox 16 includes a gearbox housing 34, a plurality of intermeshed first gears 36A-F (generically referred to as "36") and a plurality of intermeshed second gears 38A-G (generically referred to as "38"). The gearbox 16 may also include one or more first torque transmission devices 40 and 42 and/or one or more second torque transmission devices 44 and 46.

Figure 3:
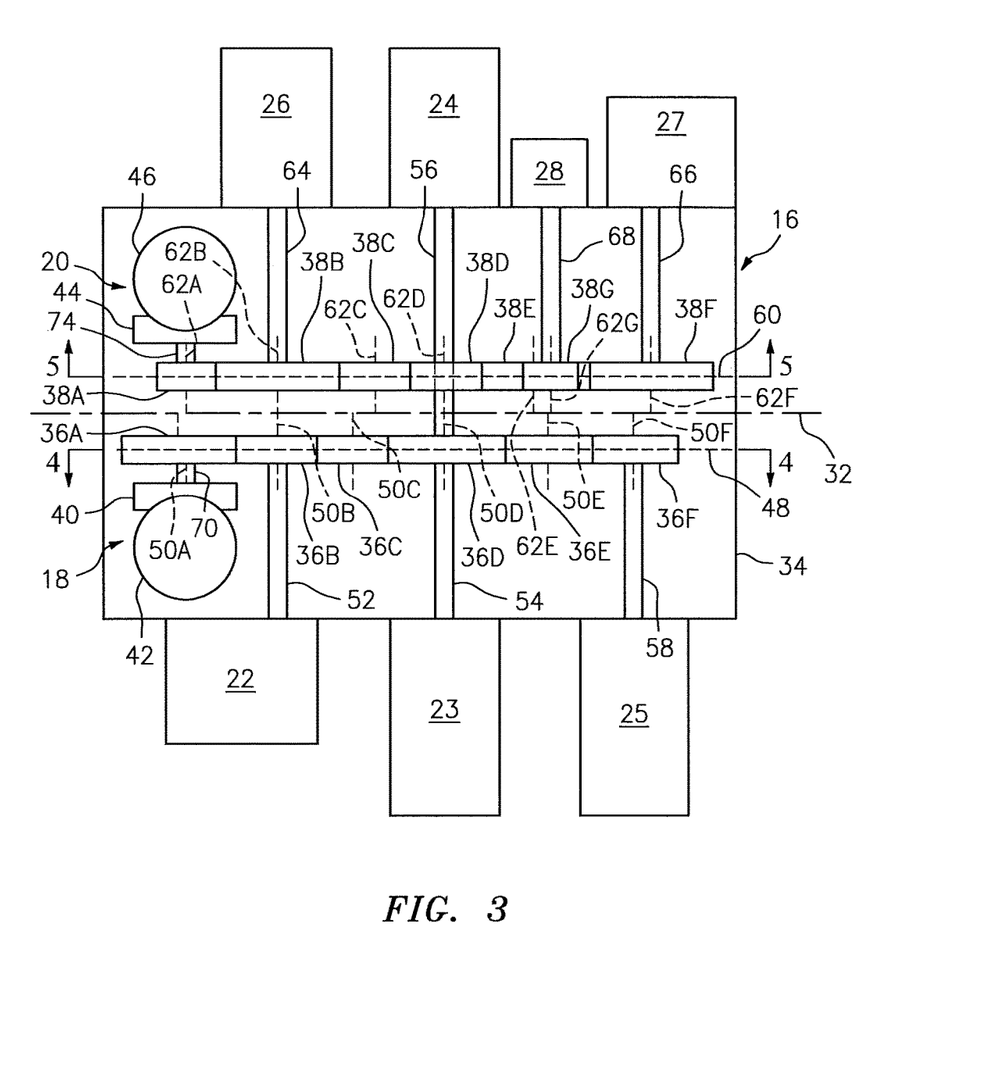
FIG. 3 is a schematic illustration of the gearbox and the turbine engine accessories.
Figure 4:
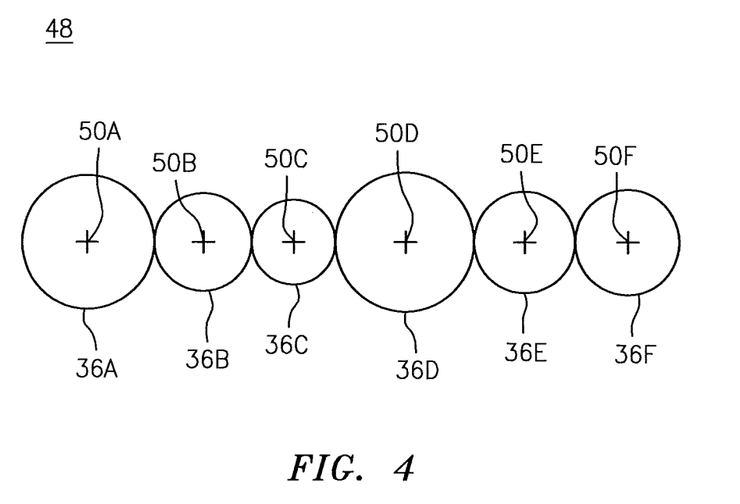
FIG. 4 is a schematic illustration of a plurality of first gears.

Referring to FIG. 3, the first gears 36 are disposed and rotatably mounted within the gearbox housing 34. Referring now to FIGS. 3 and 4, the first gears 36 are arranged and rotatable within a first plane 48; e.g., the plane of FIG. 4. More particularly, the first plane 48 extends linearly through (and/or along) each of the first gears 36. Each of the first gears 36A-F also rotates about a respective rotational axis 50A-F that is substantially perpendicular to the first plane 48. The first plane 48 may be configured at least substantially in parallel with the axial centerline 32. With such a configuration, the rotational axes 50A-F of the first gears 36A-F are non-parallel with (e.g., substantially perpendicular to) the axial centerline 32.

Each of the first gears 36 is meshed with at least another one of the first gears 36. The term "meshed" may describe an interface between a pair of gears where teeth of those gears at the interface mate and interlock together. The first gears 36 are thereby meshed together within the first plane 48. In the specific embodiment of FIGS. 3 and 4, the first gear 36B is disposed between and meshed with the first gear 36A and the first gear 36C. The first gear 36C is disposed between and meshed with the first gear 36B and the first gear 36D. The first gear 36D is disposed between and meshed with the first gear 36C and the first gear 36E. The first gear 36E is disposed between and meshed with the first gear 36D and the first gear 36F. As shown in FIG. 4, the first gears 36 may be arranged substantially inline with one another (e.g., along a straight, curved or tortuous line). However, in other embodiments, one or more of the first gears 36 may be disposed out-of-line, for example, in a similar manner as described below with reference to the second gear 38G in FIG. 5.

In the specific embodiment of FIG. 3, the first gear 36B is coupled with a drive shaft 52 of and thereby operable to actuate the accessory 22. The first gear 36D is coupled with a drive shaft 54 of and thereby operable to actuate the accessory 23. The first gear 36D is also coupled with a drive shaft 56 of and thereby operable to actuate the accessory 24. Note, the second gear 36D is operable to rotate about the drive shaft 56 such that the first gears 36 can still rotate independently of the second gears 38. The first gear 36F is coupled with a drive shaft 58 of and thereby operable to actuate the accessory 25.

The second gears 38 are also disposed and rotatably mounted within the gearbox housing 34. However, the second gears 38 are configured as rotatably independent from the first gears 36. For example, none of the second gears 38 is meshed with or otherwise fixedly attached to any of the first gears 36. Thereby, none of the second gears 38 is driven by or drives any of the first gears 36.

Figure 5:
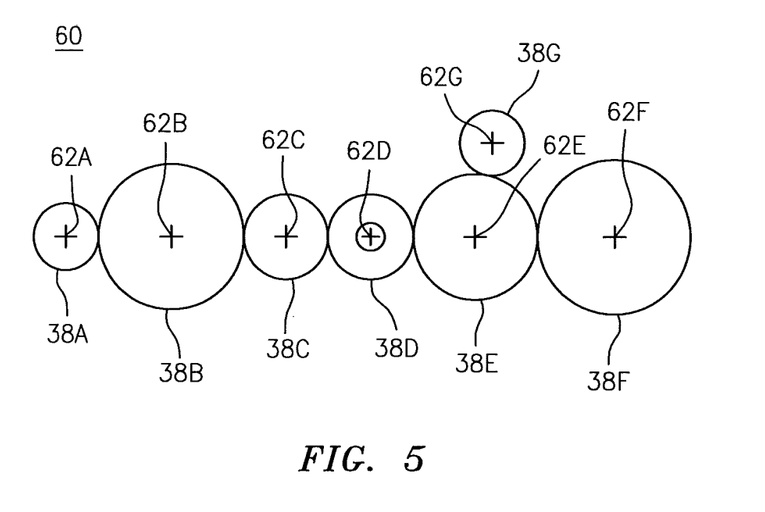
FIG. 5 is a schematic illustration of a plurality of second gears.

Referring to FIGS. 3 and 5, the second gears 38 are arranged and rotatable within a second plane 60; e.g., the plane of FIG. 5. More particularly, the second plane 60 extends linearly through (and/or along) each of the second gears 38. Each of the second gears 38A-G also rotates about a respective rotational axis 62A-G that is substantially perpendicular to the second plane 60. The second plane 60 may be configured at least substantially in parallel with the axial centerline 32. With such a configuration, the rotational axes 62A-G of the second gears 38A-G are non-parallel with (e.g., substantially perpendicular to) the axial centerline 32. The second plane 60 may also be configured substantially parallel, but spaced away from, the first plane 48. However, in other embodiments, the second plane 60 may be angularly offset from the first plane 48 by an acute included angle therebetween. The second plane 60 of FIG. 6, for example, is angularly offset from the first plane 48 by an acute angle 63. The first and the second planes 48 and 60, however, may be substantially parallel to the axial centerline 32.

Referring again to FIGS. 3 and 5, each of the second gears 38 is meshed with at least another one of the second gears 38. As described above, the term "meshed" may describe an interface between a pair of gears where teeth of those gears at the interface mate and interlock together. The second gears 38 are thereby meshed together within the second plane 60. In the specific embodiment of FIGS. 3 and 4, the second gear 38B is disposed between and meshed with the second gear 38A and the second gear 38C. The second gear 38C is disposed between and meshed with the second gear 38B and the second gear 38D. The second gear 38D is disposed between and meshed with the second gear 38C and the second gear 38E. The second gear 38E is disposed between and meshed with the second gear 38D and the second gear 38F. The second gear 38E is also meshed with the second gear 38G, which is arranged out-of-line with the other second gears 38. Of course, in some embodiments, one or more of the other second gears 38 may also or additionally be arranged out-of-line. Alternatively, in other embodiments, all of the second gears 38 may be arranged substantially inline with one another.

In the specific embodiment of FIG. 3, the second gear 38B is coupled with a drive shaft 64 of and thereby operable to actuate the accessory 26. The second gear 38F is coupled with a drive shaft 66 of and thereby operable to actuate the accessory 27. The second gear 38G is also coupled with a drive shaft 68 of and thereby operable to actuate the accessory 28.

The first gears 36 and the second gears 38 may each be configured as a spur gear. However, the present disclosure is not limited to such an exemplary gear type. For example, in other embodiments, one or more of the gears may be configured as a helical gear or any other type of suitable gear.

The first torque transmission devices 40 and 42 are disposed and rotatably mounted within the gearbox housing 34. Each of the first torque transmission devices 40 and 42 of FIG. 3 is configured as a bevel gear. However, in other embodiments, these torque transmission devices 40 and 42 may alternatively be configured as another type of gearing, transmission system and/or linkage assembly. Referring again to the embodiment of FIG. 3, the first torque transmission device 40 is fixedly attached to the first gear 36A, for example, through a shaft 70. The first torque transmission device 42 is meshed with the first torque transmission device 40. The first torque transmission device 42 is also configured to mate with another torque transmission device 72 such as, for example, a first tower shaft; see FIGS. 1 and 2.

Referring again to FIG. 3, second torque transmission devices 44 and 46 are disposed and rotatably mounted within the gearbox housing 34. Each of the second torque transmission devices 44 and 46 of FIG. 3 is configured as a bevel gear. However, in other embodiments, these torque transmission devices 44 and 46 may alternatively be configured as another type of gearing, transmission system and/or linkage assembly. Referring again to the embodiment of FIG. 3, the second torque transmission device 44 is fixedly attached to the second gear 38A, for example, through a shaft 74. The second torque transmission device 46 is meshed with the second torque transmission device 44. The second torque transmission device 46 is also configured to mate with another torque transmission device 76 such as, for example, a second tower shaft; see FIGS. 1 and 2.

Referring to FIGS. 2 and 3, the first torque transmission apparatus 18 includes one or more of the torque transmission devices 40, 42 and/or 72. The torque transmission device 72 (e.g., the first tower shaft) is configured to mechanically couple the first rotating assembly 12 with the first torque transmission device 42. As a result, the first rotating assembly 12 is operable to drive rotation of the first gears 36 through the first torque transmission apparatus 18.

The second torque transmission apparatus 20 includes one or more of the torque transmission devices 44, 46 and/or 76. The torque transmission device 76 (e.g., the second tower shaft) is configured to mechanically couple the second rotating assembly 14 with the second torque transmission device 46. As a result, the second rotating assembly 14 is operable to drive rotation of the second gears 38 through the second torque transmission apparatus 20. During turbine engine operation, the second rotating assembly 14 typically rotates at a different (e.g., higher) rotational velocity than the first rotating assembly 12. As a result, the turbine engine assembly 10 is operable to drive the accessories at different speeds without requiring the addition of a complicated reduction transmission within the gearbox 16.

Figure 7:
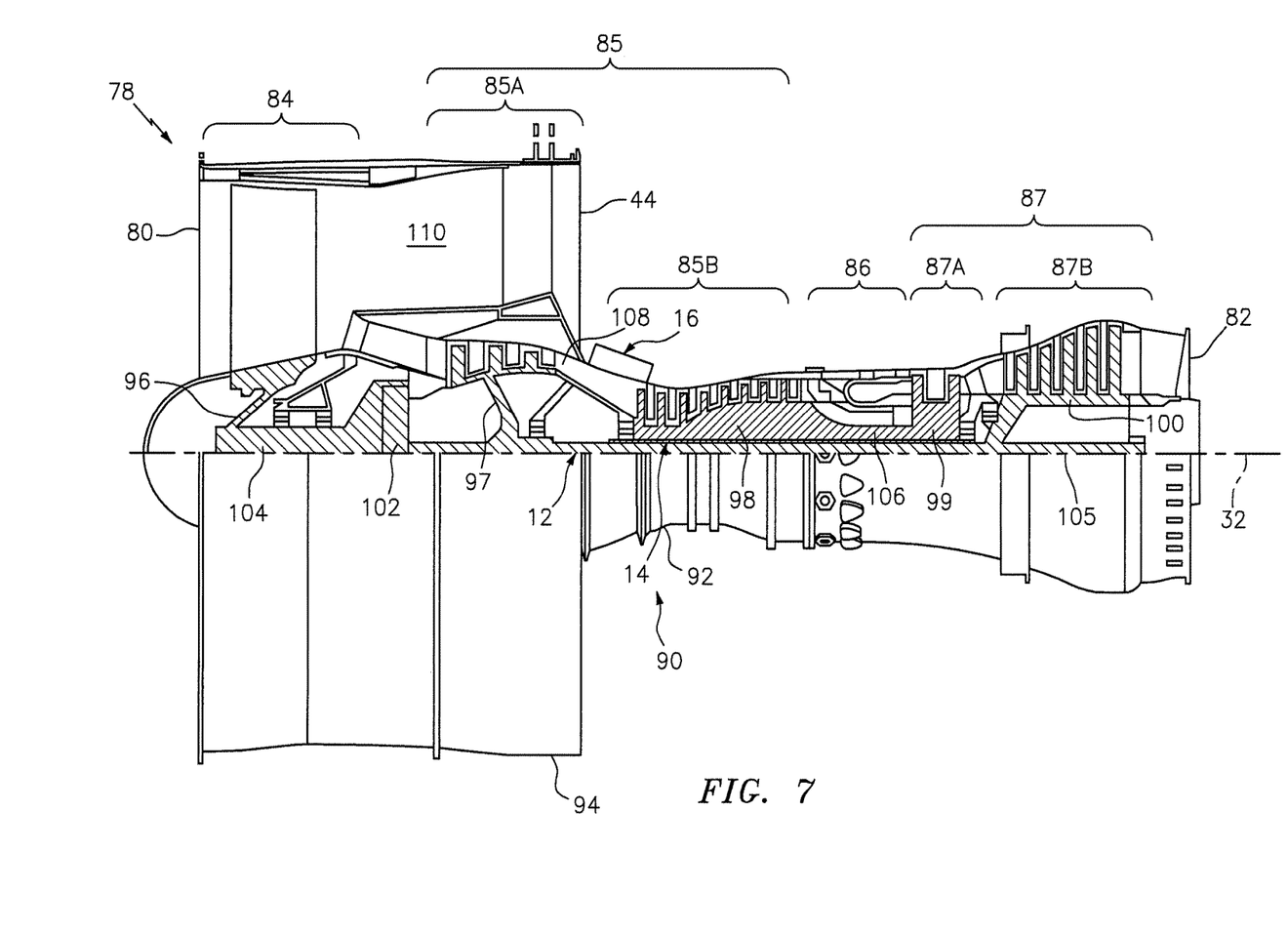
FIG. 7 is side cutaway illustration of an exemplary gas turbine engine.

FIG. 7 is a side cutaway illustration of an exemplary gas turbine engine 78 with which the turbine engine assembly 10 may be included. This turbine engine 78 extends along the axial centerline 32 between an upstream airflow inlet 80 and a downstream airflow exhaust 82. The turbine engine 78 includes a fan section 84, a compressor section 85, a combustor section 86 and a turbine section 87. The compressor section 85 includes a low pressure compressor (LPC) section 85A and a high pressure compressor (HPC) section 85B. The turbine section 87 includes a high pressure turbine (HPT) section 87A and a low pressure turbine (LPT) section 87B.

The engine sections 84-87 are arranged sequentially along the centerline 32 within an engine housing 90. This housing 90 includes an inner case 92 (e.g., a core case) and an outer case 94 (e.g., a fan case). The inner case 92 may house one or more of the engine sections 85-87; e.g., an engine core. The outer case 94 may house at least the fan section 84.

Each of the engine sections 84, 85A, 85B, 87A and 87B includes a respective rotor 96-100. Each of these rotors 96-100 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 96 is connected to a gear train 102, for example, through a fan shaft 104. The gear train 102 and the LPC rotor 97 are connected to and driven by the LPT rotor 100 through a low speed shaft 105. A combination of the rotors 96, 97 and 100, the gear train 102 and the shafts 104 and 105 may form the first rotating assembly 12 of FIG. 1. The HPC rotor 98 is connected to and driven by the HPT rotor 99 through a high speed shaft 106. A combination of the rotors 98 and 99 and the shaft 106 may form the second rotating assembly 14 of FIG. 1.

Figure 6:
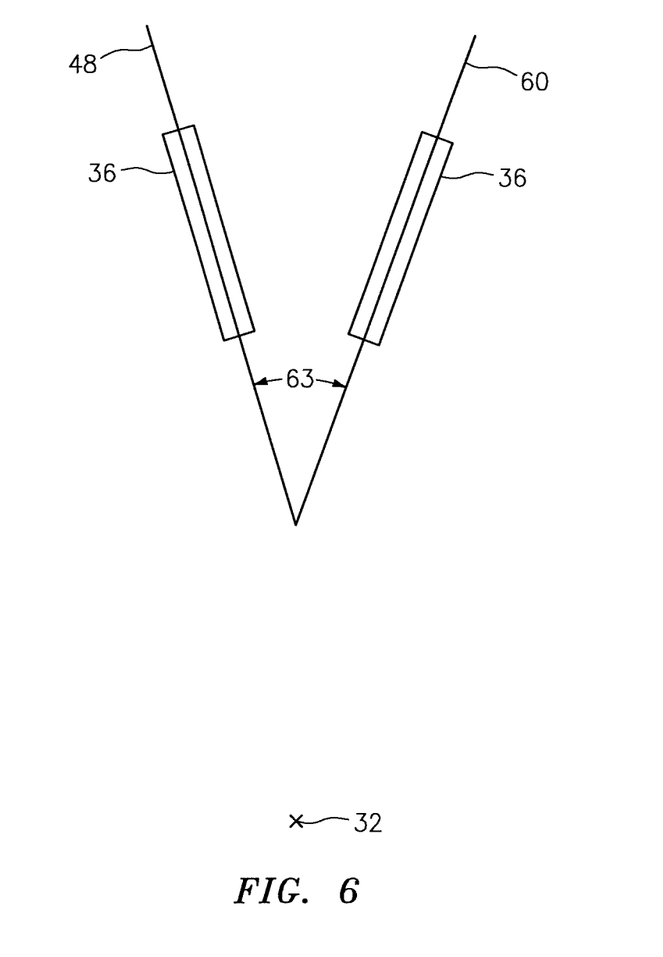
FIG. 6 is a schematic illustration of gear(s) in a first plane acutely angled to gear(s) in a second plane.

Referring still to FIG. 6, the shafts 104-105 are rotatably supported by a plurality of bearings; e.g., rolling element and/or thrust bearings. Each of these bearings is connected to the engine housing 90 by at least one stationary structure such as, for example, an annular support strut.

During operation, air enters the turbine engine 78 through the airflow inlet 80. This air is directed through the fan section 84 and into a core gas path 108 and a bypass gas path 110. The core gas path 108 extends sequentially through the engine sections 85-87; e.g., an engine core. The air within the core gas path 108 may be referred to as "core air". The bypass gas path 110 extends through a bypass duct, which bypasses the engine core. The air within the bypass gas path 110 may be referred to as "bypass air".

The core air is compressed by the compressor rotors 97 and 98 and directed into a combustion chamber of a combustor in the combustor section 86. Fuel is injected into the combustion chamber and mixed with the compressed core air to provide a fuel-air mixture. This fuel air mixture is ignited and combustion products thereof flow through and sequentially cause the turbine rotors 99 and 100 to rotate. The rotation of the turbine rotors 99 and 100 respectively drive rotation of the compressor rotors 98 and 97 and, thus, compression of the air received from a core airflow inlet. The rotation of the turbine rotor 100 also drives rotation of the fan rotor 96, which propels bypass air through and out of the bypass gas path 110. The propulsion of the bypass air may account for a majority of thrust generated by the turbine engine 78, e.g., more than seventy-five percent (75%) of engine thrust. The turbine engine 78 of the present disclosure, however, is not limited to the foregoing exemplary thrust ratio.

The turbine engine assembly 10 and its gearbox 16 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a turbine engine configured without a gear train. The turbine engine assembly 10 may be included in a geared or non-geared turbine engine configured with two spools (e.g., see FIG. 7), or with more than two spools. The turbine engine may be configured as a turbofan engine, a turbojet engine, a propfan engine, a pusher fan engine or any other type of turbine engine. The present invention therefore is not limited to any particular types or configurations of turbine engines.

The term "substantially" is used above to describe a degree of relative position between elements. This degree of relative position is intended to include an exact relative position as well as a slight misalignment in the relative position. For example, the first plane 48 in FIG. 3 is described above as being substantially parallel with the axial centerline 32. Thus, the first plane 48 may be exactly parallel with the axial centerline 32, or slightly offset from parallel by no more than +/−5 degrees.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a gas turbine engine with an axial centerline, the assembly comprising:
   a gearbox including a plurality of first gears and a plurality of second gears, the first gears meshed together and respectively rotatable about parallel first gear axes, and the second gears meshed together and respectively rotatable about parallel second gear axes, wherein each of the first gear axes and each of the second gear axes is non-parallel with the axial centerline;
   a first torque transmission apparatus configured to drive the first gears, the first torque transmission apparatus comprising a first tower shaft; and
   a second torque transmission apparatus configured to drive the second gears, the second torque transmission apparatus comprising a second tower shaft that is non-coaxial with the first tower shaft,
   wherein the gearbox further includes a drive shaft coupled with one of the first gears; and one of the second gears is rotable about the drive shaft.

2. The assembly of claim 1, wherein
   the first gears are meshed together in a first plane parallel with the axial centerline; and
   the second gears are meshed together in a second plane parallel with the axial centerline.

3. The assembly of claim 2, wherein the second plane is parallel with and spaced from the first plane.

4. The assembly of claim 1, wherein the second gears are configured rotatably independent from the first gears.

5. The assembly of claim 1, wherein each of the first gear axes and each of the second gear axes is substantially perpendicular to the axial centerline.

6. The assembly of claim 1, wherein the first torque transmission apparatus comprises a first bevel gear rotatably attached to one of the first gears, and the second torque transmission apparatus comprises a second bevel gear rotatably attached to one of the second gears.

7. The assembly of claim 6, wherein the first bevel gear and the second bevel gear are arranged within the gearbox.

8. The assembly of claim 1, further comprising:
   a first rotating assembly; and
   a second rotating assembly rotationally discrete from the first rotating assembly;
   wherein the first torque transmission apparatus is configured to couple the first rotating assembly with the first gears, and the second torque transmission apparatus is configured to couple the second rotating assembly with the second gears.

9. The assembly of claim 8, wherein
   the first rotating assembly includes a first compressor rotor, a first turbine rotor and a first shaft that connects the first compressor rotor with the first turbine rotor; and the second rotating assembly includes a second compressor rotor, a second turbine rotor and a second shaft that connects the second compressor rotor with the second turbine rotor.

10. The assembly of claim 1, further comprising
a first turbine engine accessory mounted to the gearbox, wherein one of the first gears is configured to respectively drive actuation of the first turbine engine accessory; and
a second turbine engine accessory mounted to the gearbox, wherein one of the second gears is configured to respectively drive actuation of the second turbine engine accessory.

11. The assembly of claim 10, wherein the first accessory comprises a generator.

12. The assembly of claim 10, wherein the first accessory comprises a pump.

13. The assembly of claim 10, wherein the first accessory comprises a transmission.

14. An assembly for a gas turbine engine with an axial centerline, the assembly comprising:
a first rotating assembly rotatable about the axial centerline and comprising a first rotor including a plurality of first rotor blades; a second rotating assembly rotatable about the axial centerline and comprising a second rotor including a plurality of second rotor blades;
a gearbox including a plurality of intermeshed first gears and a plurality of intermeshed second gears, the first gears rotatable about respective first axes that are non-parallel with the axial centerline, and the second gears rotatable about respective second axes that are non-parallel with the axial centerline;
a first tower shaft, the first gears driven by the first rotating assembly through the first tower shaft; and,
a second tower shaft angularly offset from the first tower shaft, the second gears driven by the second rotating assembly through the second tower shaft wherein the gearbox further includes a drive shaft coupled with one of the first gears; and one of the second gears is rotable about the drive shaft.

15. The assembly of claim 14, further comprising:
a first torque transmission apparatus configured to transfer torque between the first rotating assembly and the first gears, the first torque transmission apparatus comprising the first tower shaft; and
a second torque transmission apparatus configured to transfer torque between the second rotating assembly and the second gears, the second torque transmission apparatus comprising the second tower shaft.

16. The assembly of claim 14, wherein the first gears are meshed together in a first plane that is parallel with the axial centerline, and the second gears are meshed together in a second plane that is parallel with the axial centerline.

17. An assembly for a gas turbine engine with an axial centerline, the assembly comprising:
a gearbox including
a plurality of first gears meshed together and respectively rotatable about parallel first gear axes;
a plurality of second gears meshed together and respectively rotatable about parallel second gear axes, wherein each of the first gear axes and each of the second gear axes is non-parallel with the axial centerline; and
a drive shaft coupled with one of the first gears, wherein one of the second gears is rotatable about the drive shaft;
a first torque transmission apparatus configured to drive the first gears; and
a second torque transmission apparatus configured to drive the second gears independent of the first gears.

18. The assembly of claim 17, wherein
the first torque transmission apparatus comprising a first tower shaft; and
the second torque transmission apparatus comprising a second tower shaft that is angularly offset from the first tower shaft.

* * * * *